US008159775B2

(12) United States Patent
Armendariz et al.

(10) Patent No.: US 8,159,775 B2
(45) Date of Patent: Apr. 17, 2012

(54) VIBRATION IDENTIFICATION AND ATTENUATION SYSTEM AND METHOD

(75) Inventors: Luis C. Armendariz, Spring, TX (US); David Gough, Cypress, TX (US); Punan Tang, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1281 days.

(21) Appl. No.: 11/881,525

(22) Filed: Jul. 27, 2007

(65) Prior Publication Data

US 2009/0027846 A1    Jan. 29, 2009

(51) Int. Cl.
*G11B 31/00* (2006.01)
*G11B 33/14* (2006.01)

(52) U.S. Cl. .................... 360/79; 73/587; 360/75
(58) Field of Classification Search .............. None
See application file for complete search history.

(56) References Cited

U.S. PATENT DOCUMENTS

| | | | |
|---|---|---|---|
| 5,388,160 A * | 2/1995 | Hashimoto et al. ........ 381/71.14 |
| 5,636,193 A * | 6/1997 | Ohmi .......................... 360/73.03 |
| 5,893,048 A * | 4/1999 | Pate et al. ................... 360/73.03 |
| 6,067,362 A | 5/2000 | Lemanski et al. |
| 6,157,116 A * | 12/2000 | Sampietro et al. ............ 310/334 |
| 6,392,833 B1 | 5/2002 | Wood et al. |
| 6,591,198 B1 * | 7/2003 | Pratt ............................. 702/35 |
| 6,636,376 B1 | 10/2003 | Ho |
| 6,710,965 B2 | 3/2004 | Ding et al. |
| 7,139,401 B2 * | 11/2006 | Culman et al. ............... 381/71.7 |
| 7,277,722 B2 * | 10/2007 | Rosenzweig ............. 455/550.1 |
| 7,372,654 B2 * | 5/2008 | Fujie et al. ...................... 360/69 |
| 7,587,057 B2 * | 9/2009 | Baugh et al. .................. 381/124 |
| 7,620,739 B2 * | 11/2009 | Singer et al. .................... 360/75 |
| 7,787,636 B1 * | 8/2010 | Yanning et al. .............. 381/71.1 |
| 2003/0174432 A1 | 9/2003 | Iwashiro |
| 2004/0205403 A1 | 10/2004 | Markow et al. |
| 2004/0222908 A1 | 11/2004 | MacDonald et al. |
| 2005/0234715 A1 * | 10/2005 | Ozawa ........................ 704/226 |
| 2005/0248867 A1 | 11/2005 | Choi |
| 2006/0072228 A1 | 4/2006 | Geerlings et al. |
| 2007/0074077 A1 | 3/2007 | Markow et al. |
| 2007/0167198 A1 | 7/2007 | Subramaniam et al. |

FOREIGN PATENT DOCUMENTS

| | | | |
|---|---|---|---|
| CN | 1764324 A | | 4/2006 |
| EP | 1536419 | | 6/2005 |
| JP | 06036315 A | * | 2/1994 |

OTHER PUBLICATIONS

Great Britain, Examination Report, dated Feb. 23, 2010, 1 page.
GB Intellectual Property Office, Examination Report under Section 18(3), Appln No. 1001097.3 pages 4, Mar. 3, 2011.
Intellectual Property Office, Examination Report under Section 18(3), Appln No. 1001097.3, date of report Nov. 8, 2011, 3 p.

* cited by examiner

*Primary Examiner* — K. Wong
*Assistant Examiner* — James L Habermehl

(57) ABSTRACT

A vibration attenuation method comprising identifying a hard drive disposed on an electronic device and, based on the identity of the hard drive, attenuating an output of at least one operation of the electronic device.

23 Claims, 3 Drawing Sheets

VIBRATION IDENTIFICATION AND ATTENUATION SYSTEM AND METHOD

BACKGROUND OF THE INVENTION

Electronic devices generally have at least one speaker, thereby enabling a user to listen to music or any other type of audio content. However, in some circumstances, the sound waves generated by the speaker tends to induce an acoustical and/or structural vibration which may adversely affect the performance of one or more components of the electronic device.

DETAILED DESCRIPTION OF THE DRAWINGS

Figure 1:
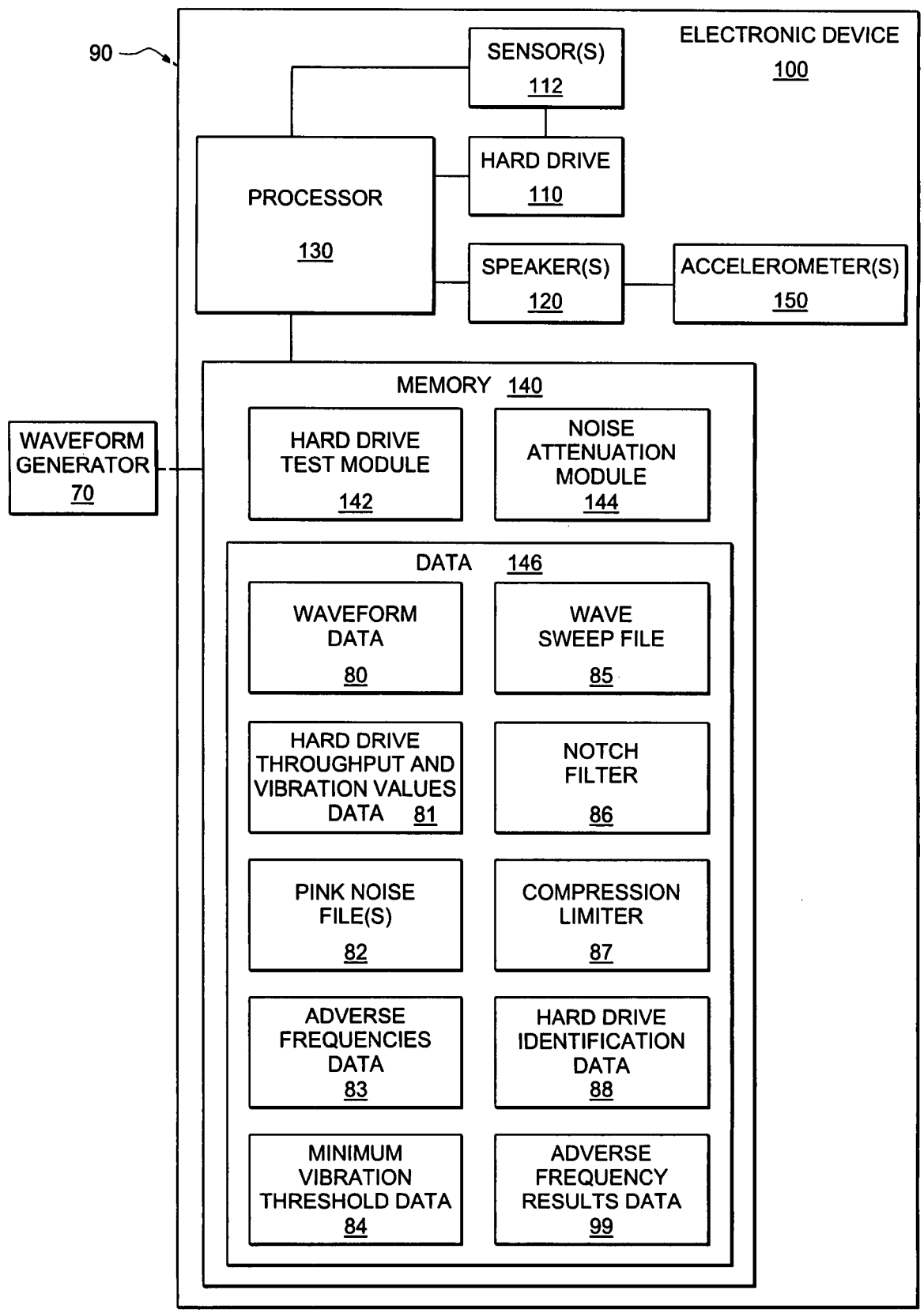
FIG. 1 is a block diagram of an electronic device in which an embodiment of a vibration identification and attenuation system is employed to advantage.

FIG. 1 is a block diagram of an electronic device 100 comprising an embodiment of a vibration identification and attenuation system 90. Vibration identification and attenuation system 90 is configured to identify at least one frequency that induces a vibration in electronic device 100 that may otherwise adversely affect the performance of at least one component of electronic device and is configured to dissipate and/or otherwise attenuate the identified frequency. In the illustrated embodiment, vibration identification and attenuation system 90 comprises a waveform generator 70. Waveform generator 70 is an electronic device which generates and/or transmits a repeating electronic signal (e.g., a sine wave signal, a square wave signal, a triangular wave signal, etc.) at a specified frequency to electronic device 100. Electronic device 100 can be any type of electronic device, such as, but not limited to, a laptop computer, a tablet computer, a personal digital assistant (PDA), a cellular phone, a gaming device, or any type of portable or non-portable electronic device. In the illustrated embodiment, electronic device 100 comprises a hard drive 110, a sensor(s) 112, a speaker(s) 120, a processor 130, a memory 140, and an accelerometer(s) 150. Sensor(s) 112 comprises at least one sensor configured to identify various operating parameters for electronic device 100 (e.g., read and write cycles per second for hard drive 110, an operating temperature, a fan speed, etc.). Speaker(s) 120 comprise one or more electromechanical transducers which converts an electronic signal into sound which can be used to determine the frequencies which induce an adverse vibration affecting one or more components of electronic device 100 such as, but not limited to, hard drive 110. Processor 130 is used to control test parameters associated with identifying frequencies that may emanate and/or be output from speaker(s) 120 that may adversely affect the performance of one or more components of electronic device 100.

In the illustrated embodiment, system 90 comprises a hard drive test module 142 and a noise attenuation module 144. Hard drive test module 142 and noise attenuation module 144 may comprise hardware, software, firmware, or a combination thereof. In FIG. 1, hard drive test module 142 and noise attenuation module 144 are illustrated as being stored in memory 140 so as to be accessible and/or executable by processor 130. However, it should be understood that hard drive test module 142 and/or noise attenuation module 144 may be otherwise located, even remotely. Hard drive test module 142 is configured to manage and/or control the test processes for identifying and/or recording a potentially adverse vibration affecting hard drive 110. Noise attenuation module 144 is used to manage and/or control the frequency and/or amplitude of sound waves output by speaker(s) 120 to reduce and/or substantially eliminate potential adverse conditions that may be otherwise caused by such output.

In FIG. 1, memory 140 comprises data 146 in the form of databases and/or other forms of data (e.g., tables, files, worksheets, etc.) for identifying and/or attenuating a potentially adverse vibration. In the illustrative embodiment, data 146 comprises a waveform data 80, a hard drive throughput and vibration values data 81, pink noise file(s) 82, adverse frequencies data 83, minimum vibrations threshold data 84, a wave sweep file 85, and adverse frequency results data 99. In the illustrated embodiment, waveform data 80 comprises information associated with different types of sound wave signals (e.g., a sine wave signal, a square wave signal, a triangle wave signal, etc.) and a list of frequencies for each sound wave signal that can be used in identifying a potentially adverse vibration. Hard drive throughput and vibration values data 81 comprises information associated with the throughput operation values (e.g., read and write operations per second) and the vibration values (e.g., vibration acceleration level relative to acceleration of gravity) for hard drive 110. Pink noise file(s) 82 is one or more files executable to generate a pink noise at a particular frequency. Pink noise, commonly referred to as "1/f noise," is a signal with a power spectral density proportional to the reciprocal of a particular frequency. In some embodiments, it should be understood that pink noise file(s) 82 may comprise other types of sound wave signals (e.g., white noise files, random noise files, etc.). Adverse frequencies data 83 is data illustrating a relationship between the frequency of a sound wave signal output by speaker(s) 120 and a hard drive 110 throughput. In some embodiments, vibration identification and attenuation system 90 comprises minimum vibrations threshold data 84 used to identify the minimum throughput and/or the maximum acceptable vibration level of hard drive 110 before hard drive 110 is considered inoperable and/or in failure mode. Minimum vibration threshold data 84 can be established using a variety of measurement standards and/or bases including, but not limited to, establishing a precise number of read and write operations per second (e.g., seventeen read and write cycles per second), establishing a percentage of a particular number of operations performed by hard drive 110 (e.g., 50% of base line operations), and/or the maximum vibration value which causes operations of hard drive 110 to fall below a particular number or percentage. Wave sweep file 85 is a prerecorded sound wave file having a particular frequency. It should be understood that wave sweep file 85 is not limited to a particular type of waveform and/or may comprise a plurality of wave sweep file 85 at various frequency increments (e.g., 50 Hertz increments, 100 Hertz increments, etc.). Adverse frequencies results data 99 comprises information associated with the frequencies of the sound wave signals that are associated with causing an unacceptable vibration in hard drive 110.

Thus, in operation, hard drive test module 142 identifies a particular waveform at a particular frequency from waveform data 80 that is used by waveform generator 70 to generate a test signal. The waveform and/or frequency of the test signal can be selected by a user or an administrator of electronic device 100 and/or be a predetermined setting determined by the manufacture of electronic device 100. Speaker(s) 120 emanates and/or outputs audio content using the indicated test signal. Sensor 112 reads and/or identifies the hard drive throughput of hard drive 110 (e.g., number of read and write cycles per second) and transmits the results to hard drive test module 142. Hard drive test module 142 stores the read hard drive throughput value for hard drive 110 as hard drive throughput and vibration values data 81. In some embodiments, hard drive test module 142 then identifies and selects another sound wave signal at another frequency from waveform data 80 and repeats the process of having waveform generator 70 generate a test signal and reading the hard drive throughput values for a range of frequencies (e.g., in increments of 100 Hertz between a range of 300 and 2000 Hertz). In some embodiments, hard drive test module 142 then takes the readings stored in hard drive throughput and vibration values data 81 and plots the resulting throughput to form adverse frequency data 83. In some embodiments, adverse frequency data 83 includes minimum vibrations threshold data 84. Throughput values recorded as hard drive throughput and vibration values database 81 which are shown and/or plotted above minimum vibrations threshold data 84 indicate the frequencies which are potentially adverse to hard drive 110. In some embodiments, hard drive test module 142 then stores the identified frequencies as adverse frequency results data 99.

In some embodiments, hard drive test module 142 uses at least one pink noise file 82 to identify the frequency that may adversely affect the performance of hard drive 110. In this embodiment, hard drive test module 142 provides and/or enables at least one pink noise file 82 to be played and/or output directly by speaker(s) 120, (e.g., without using waveform generator 60). In this embodiment, accelerometer(s) 150 detects and/or reads a vibration generated by hard drive 110 as pink noise file 82 is being played and/or output by speaker(s) 120. Hard drive test module 142 receives the reading from accelerometer(s) 150 and records the vibration values as hard drive throughput and vibration values data 81. In some embodiments, hard drive test module 142 then provides and/or enables speaker(s) 120 to play and/or output another pink noise file 82 at a different frequency. In some embodiments, hard drive test module 142 then repeats the process of reading the vibration value read by accelerometer(s) 150 and recording the vibration values as hard drive throughput and vibration data 81. Additionally, in some embodiments, hard drive test module 142 then takes the readings stored as hard drive throughput and vibration values data 81 and plots the resulting vibration values to form adverse frequency data 83. Vibration values shown and/or plotted to be above minimum vibrations threshold data 84 indicate the frequency which are potentially adverse to hard drive 110. It should be understood that, in alternative embodiments, hard drive test module 142 can use and/or receive hard drive throughput values from sensor 112 instead of vibration values from accelerometer(s) 150. Additionally, it should also be understood that embodiments of vibration identification and attenuation system 90 can execute and/or use a set of pre-recorded wave sweep files 85 to identify the frequency(ies) that may adversely affect the performance of hard drive 110 instead of pink noise file(s) 82. The identified frequencies are then stored as adverse frequency results data 99.

After the potentially adverse frequencies are identified, embodiments of vibration and attenuation system 90 are also configured to attenuate at least one frequency identified by hard drive test module 142 that may otherwise cause a harmful vibration in hard drive 110. In FIG. 1, system 90 comprises noise attenuation module 144, a notch filter 86, a compression limiter 87, and hard drive identification data 88. Noise attenuation module 144 is configured to manage and/or control the frequency and/or amplitude of the sound waves played and/or output by speaker(s) 120. Notch filter 86 is an equalization filter with a narrow bandwidth configured to attenuate a limited number of frequencies. Notch filter 86 is generally represented by an attenuation coefficient: (e.g., a digital value representing a signal generated to cancel and/or comprise a polarity opposite to signal to be attenuated). Compression limiter 87 is configured to set and/or limit the amplitude of a sound wave signal played and/or output by speaker(s) 120. Hard drive identification data 88 lists the operating parameters (e.g., the minimum, maximum, and average read and write cycles per second) for particular models, manufacturers, etc., of hard drives 110. In some embodiments, hard drive identification data 88 also lists a corresponding notch filter 86 that can be applied to attenuate particularly harmful frequencies. Corresponding notch filter 86 can be derived and/or identified in hard drive identification data 88 based on the identification of potentially adverse frequencies by hard drive test module 142.

Thus, in operation, noise attenuation module 144 identifies and/or reads the adverse frequencies from adverse frequency result data 99. Noise attenuation module 144 then identifies the associated notch filter 86 which will attenuate the potentially adverse frequency. Thus, in response to speaker(s) 120 playing and/or outputting a sound wave signal, noise attenuation module 144 executes notch filter 86 configured to attenuate the at least one potentially adverse frequency. In some embodiments, noise attenuation module 144 also executes and/or initiates compression limiter 87 which limits the amplitude of any sound wave signals being played and/or output by speaker(s) 120. In some embodiments, noise attenuation module 144 can execute processes which checks and/or validates the hard drive throughput and/or vibration level experienced by hard drive 110 as speaker(s) 120 is playing and/or outputting a sound wave signal. In this embodiment, noise attenuation module 144 can be set to automatically and/or periodically execute one or more of the test procedures in hard drive test module 142 (e.g., playing pink noise file(s) 62 and/or wave sweep file 65). Alternatively, a user and/or administrator can also initiate and/or execute in hard drive test module 142 to perform testing operations. In some embodiments, noise attenuation module 144 and/or hard drive test module 142 automatically executes if a new hard drive 110 and/or other new component that could otherwise affect and/or cause a potentially harmful vibration in hard drive 110 is identified on electric device 100. In this embodiment, noise attenuation module 144 refers to hard drive identification data 88 to identify the operating parameters for any newly installed hard drive 110. In some embodiments, noise attenuation module 144 can identify the corresponding notch filter 86 to apply to attenuate potentially harmful vibrations to the newly installed hard drive 110. Hard drive test module 142 may also be used as indicated above.

It should be understood that vibration identification and attenuation system 90 may comprise fewer or more components than illustrated in FIG. 1 in either or both testing operations and attenuation operation. It should also be understood that hard drive test module 142 and noise attenuation module 144 may be implemented in either a firmware (e.g., a basic input/output system (BIOS)) and/or an audio driver associated with speaker(s) 120. It should further understood that vibration identification and attenuation system 90 is not limited to the type and/or number of speaker(s) 120.

Figure 2:
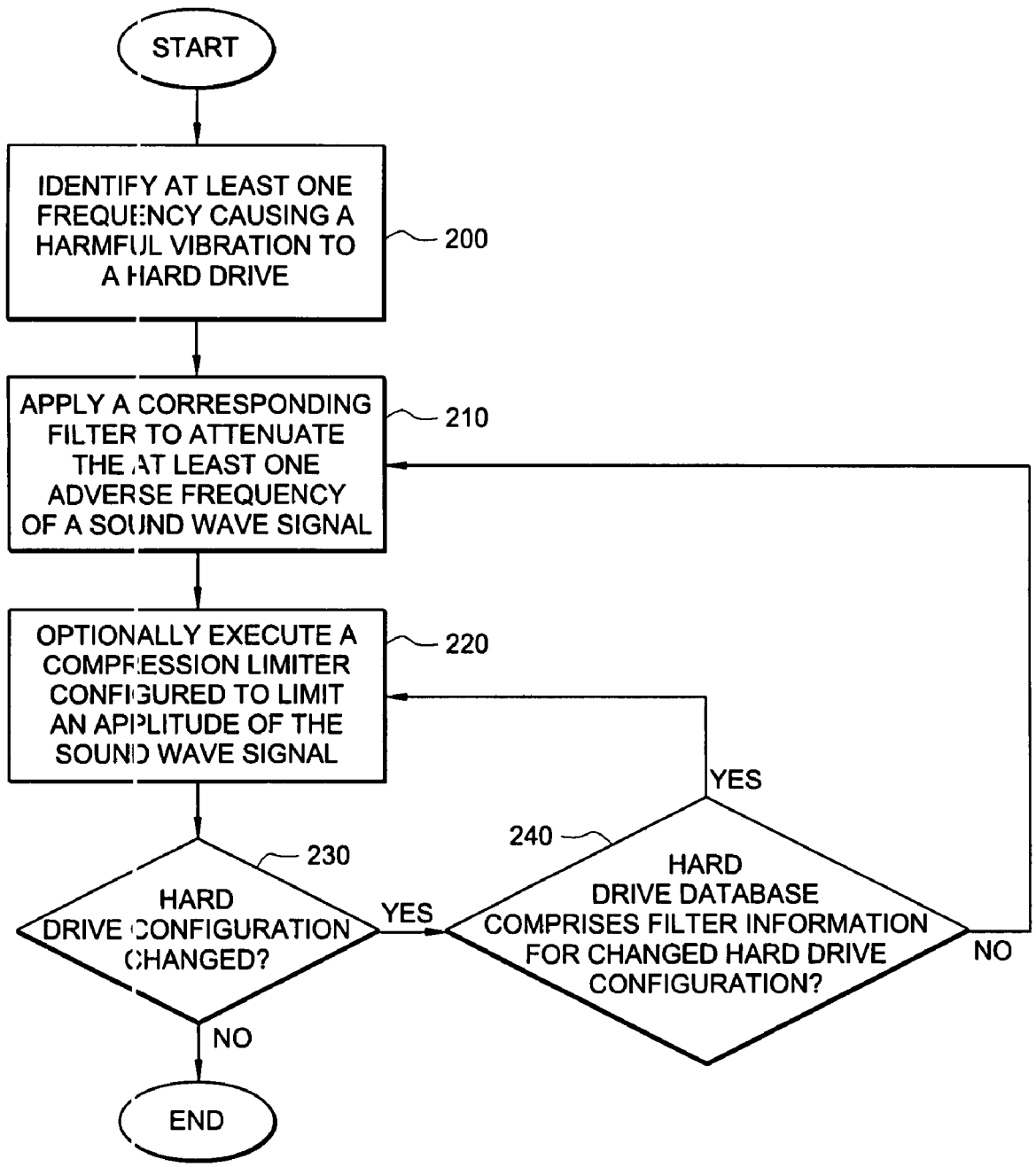
FIG. 2 is a flowchart of an embodiment of a vibration attenuation method.

FIG. 2 is a flowchart of an embodiment of a vibration attenuation method. The method begins at block 200 with noise attenuation module 144 identifying at least one frequency that may otherwise cause a harmful vibration to hard drive 110 based on the test results identified by hard drive test module 142. Noise attenuation module 144 identifies the at least one frequency by identifying the adverse frequency from adverse frequency results data 99. Noise attenuation module 144 then applies a corresponding filter (e.g., notch filter 86) to attenuate the at least one adverse frequency of a sound wave signal (block 210). Optionally, noise attenuation module 144 then executes compression limiter 87 configured to limit an amplitude of the sound wave signal (block 220). Noise attenuation module 144 then identifies whether the configuration for hard drive 110 has changed (e.g., has a new hard drive 110 and/or other component been installed) (decision block 230). If the configuration for hard drive 110 has changed ("yes" output to decision block 230), then noise attenuation module 144 determines whether hard drive identified data 88 comprises filter information for the new configurations of hard drive 110 (decision block 240). If hard drive identified data 88 does not comprise the information ("no" output to decision block 240), then the method returns to block 210 to be repeated. If, on the other hand, hard drive identified data 88 does comprise the information ("yes" output to decision block 240), then the method returns to block 220 to be repeated. Returning to decision block 230, if the configuration for hard drive 110 has not changed ("no" output to decision block 230), then method terminates thereafter.

Figure 3:
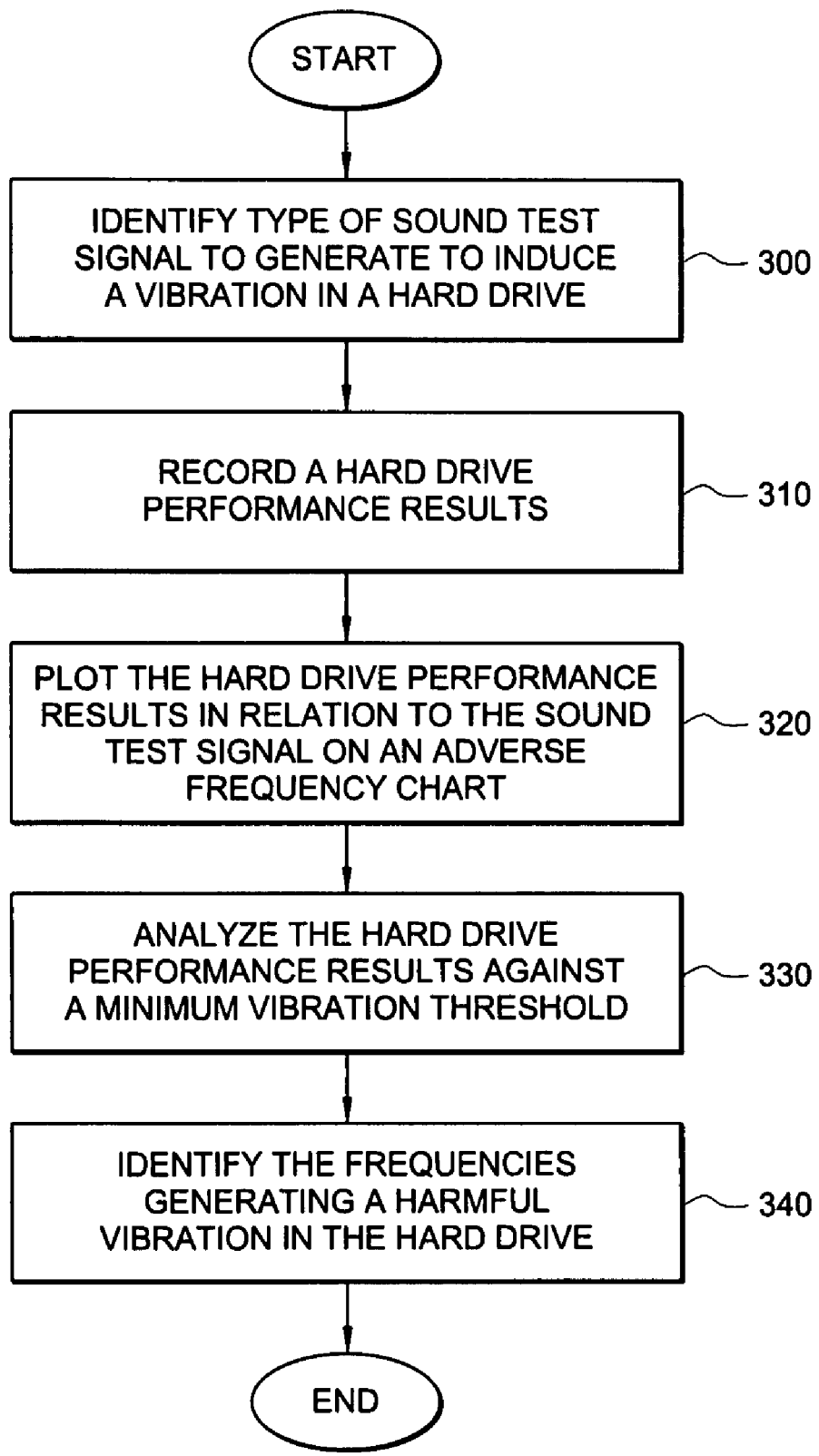
FIG. 3 is a flowchart of an embodiment of a vibration identification method.

FIG. 3 is a flowchart of an embodiment of a vibration identification method. The method begins at block 300 with hard drive test module 142 identifying a type of sound test signal (e.g., a waveform of waveform data 80, a pink noise signal from at least one pink noise file 82, a signal from at least one prerecorded wave sweep file 85, etc.) to generate to induce a potential vibration in hard drive 110. Hard drive test module 142 then records a performance result for hard drive 110 (e.g., a throughput for hard drive 110, a vibration value for hard drive 110, etc.) (block 310). The performance results are identified by sensor 112 and/or accelerometer(s) 150. Hard drive test module 142 then plots the performance results for hard drive 110 in relation to the sound test signal as adverse frequency data 83 (block 320). Hard drive test module 142 then analyzes the performance results of hard drive 110 against minimum vibration threshold data 84 (block 330). Hard drive test module 142 then identifies the adverse frequencies that may generate a harmful vibration in hard drive 110 (block 340), with the process terminating thereafter.

The illustrative embodiments may be implemented in software and can be adapted to run on different platforms and operating systems. In particular, functions implemented by hard drive test module 142 and/or noise attenuation module 144, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

Embodiments of vibration identification and attenuation system 90 provide a method for identifying and attenuating vibrations that may adversely affect hard drive 110. Vibration identification and attenuation system 90 enables hard drive 110 to adequately perform read and write operation while a user plays music or any other type of audio rendition using speaker(s) 120. Vibration identification and attenuation system 90 improves the overall performance level of hard drive 110.

What is claimed is:

1. A vibration attenuation method, comprising:
identifying at least one frequency indicated as potentially reducing a throughput of a hard drive disposed in an electronic device; and
attenuating an output at the at least one frequency, where the output is produced by a component different from the hard drive in the electronic device.

2. The method of claim 1, further comprising determining a notch filter to apply to attenuate the output.

3. The method of claim 1, further comprising:
generating a test signal for inducing vibration of the hard drive;
wherein identifying the at least one frequency is in response to the test signal.

4. The method of claim 3, further comprising:
producing a sound output in response to the test signal, wherein the sound output induces the vibration of the hard drive.

5. The method of claim 1, wherein attenuating the output comprises attenuating the output of a speaker.

6. A vibration attenuation method, comprising:
identifying a hard drive disposed in an electronic device;
based on the identity of the hard drive, attenuating an output of at least one operation of the electronic device; and
determining a compression limiter to apply to limit an amplitude of the output based on the identity of the hard drive.

7. The method of claim 6, further comprising applying a notch filter to attenuate the output.

8. A vibration attenuation method, comprising:
identifying a hard drive disposed in an electronic device;
based on the identity of the hard drive, attenuating an output of at least one operation of the electronic device; and
executing a compression limiter configured to limit an amplitude of the output.

9. The method of claim 8, further comprising accessing hard drive identification data disposed in a memory of the electronic device to determine a notch filter to apply to attenuate the output.

10. An electronic device, comprising:
a noise attenuation module configured to identify a hard drive disposed in the electronic device and attenuate an output of a speaker of the electronic device based on the identity of the hard drive.

11. The electronic device of claim 10, further comprising the noise attenuation module configured to determine a notch filter to apply to attenuate the output based on the identity of the hard drive.

12. The electronic device of claim 10, further comprising the noise attenuation module configured to determine a compression limiter to apply to limit an amplitude of the output based on the identity of the hard drive.

13. The electronic device of claim 10, further comprising the noise attenuation module configured to apply a notch filter to attenuate the output.

14. The electronic device of claim 10, further comprising a test module to generate a test signal to cause output of sound data to induce vibration of the hard drive, wherein the noise attenuation module is configured to attenuate the output at a frequency that is indicated as potentially reducing throughput of the hard drive.

15. An electronic device, comprising:
a noise attenuation module configured to identify a hard drive disposed in the electronic device and attenuate an output of at least one operation of the electronic device based on the identity of the hard drive, wherein the noise attenuation module is configured to execute a compression limiter that is configured to limit an amplitude of the output.

16. The electronic device of claim 15, further comprising the noise attenuation module configured to access hard drive identification data disposed in a memory of the electronic device to determine a notch filter to apply to attenuate the output.

17. A non-transitory computer-readable medium having stored thereon on instructions set to be executed, the instruction set, when executed by the processor, causes the processor to:
identify at least one frequency indicated as potentially reducing a throughput of a hard drive disposed in an electronic device; and
attenuate an output at the at least one frequency, where the output is produced by a component different from the hard drive in the electronic device.

18. The computer-readable medium of claim 17, wherein the instruction set, when executed by the processor, causes the processor to determine a notch filter to apply to attenuate the output.

19. The computer-readable medium of claim 17, wherein the instruction set, when executed by the processor, causes the processor to determine a compression limiter to apply to limit an amplitude of the output.

20. The computer-readable medium of claim 17, wherein the instruction set, when executed by the processor, causes the processor to apply a notch filter to attenuate the output.

21. The computer-readable medium of claim 17, wherein the instruction set, when executed by the processor, causes the processor to execute a compression limiter configured to limit an amplitude of the output.

22. The computer-readable medium of claim 17, wherein the instruction set, when executed by the processor, causes the processor to access hard drive identification data disposed in a memory of the electronic device to determine a notch filter to apply to attenuate the output.

23. The computer-readable medium of claim 17, wherein the component is a speaker.

* * * * *